United States Patent [19]

Haddock et al.

[11] Patent Number: 5,936,962

[45] Date of Patent: Aug. 10, 1999

[54] METHOD AND APPARATUS FOR PREDICTING AND CONTROLLING DATA TRANSMISSION IN A CSMA/CD LAN

[75] Inventors: Stephen Haddock, Los Gatos; Herb Schneider, San Jose, both of Calif.

[73] Assignee: Extreme Networks, Inc., Santa Clara, Calif.

[21] Appl. No.: 08/887,355

[22] Filed: Jul. 2, 1997

Related U.S. Application Data

[60] Provisional application No. 60/021,088, Jul. 2, 1996.
[51] Int. Cl.[6] .................................................. H04L 12/413
[52] U.S. Cl. .......................... 370/446; 370/448; 370/501
[58] Field of Search .................................. 370/445–448, 370/910, 911, 425, 461, 462, 501, 502, 492, 407; 340/825.06, 825.51, 825.07, 825.08; 395/200.82

[56] References Cited

U.S. PATENT DOCUMENTS

| | | | |
|---|---|---|---|
| 5,351,241 | 9/1994 | Yehonatan | 370/446 |
| 5,355,375 | 10/1994 | Christensen | 370/446 |
| 5,402,420 | 3/1995 | Kobayashi | 370/448 |
| 5,699,515 | 12/1997 | Berkema et al. | 370/447 |
| 5,742,239 | 4/1998 | Siloti | 370/448 |
| 5,771,235 | 6/1998 | Tang et al. | 370/446 |
| 5,774,658 | 6/1998 | Kalkunte et al. | 395/200.6 |

OTHER PUBLICATIONS

Wayne Hayes and Mart L. Molle, "Solving Capture in Switched Two–Node Ethernets by Changing Only One Node," Proceedings of the 20th Annual Conference on Local Computer Networks, pp. 1–9, Oct. 17–18, 1995.

Mart L. Molle, "A New Binary Logarithmic Arbitration Method for Ethernet," Computer Systems Research Institute, University of Toronto, Toronto, Canada, Technical Report CSRI–298, Apr. 1994.

"3Com Delivers PACE™ Desktop Multimedia Networking Technology," http://www.3com.com/0files/releases/dec1895.html, Dec. 18, 1995.

*Primary Examiner*—Douglas W. Olms
*Assistant Examiner*—Seema S. Rao
*Attorney, Agent, or Firm*—Blakely Sokoloff Taylor & Zafman, LLP

[57] ABSTRACT

A repeater in a LAN maintains a count of collisions and retransmission attempts for each node coupled to the repeater since that node's last successful packet transmission. The count is used to prioritize which of the nodes involved in a subsequent collision will be allowed to continue transmitting. The time at which data packets from the nodes arrive at the repeater will vary according to the propagation delay attributed to the varying lengths of the communication medium between each of the nodes and the repeater. For the repeater to arbitrate among the nodes that begin transmitting, it is useful to receive the data packets from each node at the same time. The repeater automatically equalizes the transmission delay. The repeater buffers the data packet received from each node until sufficient time has elapsed to begin receiving a data packet from each node that is attempting to transmit a data packet during the current arbitration interval. For each node, the repeater maintains a slot time counter. The backoff time following a collision is measured in increments of slot time, so using the slot time counter for a node allows the repeater to predict when it will receive a data packet from a node that is currently backed off. When a node has an opportunity to attempt transmitting a data packet at each slot time, the repeater determines if that node is going to attempt to transmit a data packet before deciding which node will be allowed to transmit a data packet.

6 Claims, 7 Drawing Sheets

Fig. 4 *(PRIOR ART)*

METHOD AND APPARATUS FOR PREDICTING AND CONTROLLING DATA TRANSMISSION IN A CSMA/CD LAN

This nonprovisional patent application claims the benefit of U.S. Provisional Application No. 60/021,088, filed Jul. 2, 1996, entitled, "DETERMINISTIC ACCESS CSMA/CD LAN REPEATER." This nonprovisional patent application is related to nonprovisional patent application Ser. No. 08/886,912, filed concurrently herewith, titled "A REPEATER PROVIDING FOR DETERMINISTIC ACCESS IN A LAN UTILIZING THE CSMA/CD MEDIUM ACCESS METHOD" and nonprovisional patent application Ser. No., 08/887,356, filed concurrently herewith, titled "METHOD AND APPARATUS FOR ARBITRATING DATA TRANSMISSION IN A CSMA/CD LAN".

BACKGROUND OF THE INVENTION

1. Field of the Invention

The present invention is related to a Local Area Network (LAN) employing the Carrier Sense, Multiple Access with Collision Detection (CSMA/CD) Media Access Control (MAC) protocol, such as an IEEE standard 802.3 LAN or Ethernet LAN, hereafter collectively referred to as a CSMA/CD based LAN, or simply, CSMA/CD LAN. More specifically, the present invention is related to a repeating device, such as a repeater or hub, providing for deterministic access in a CSMA/CD LAN for up to and including 15 nodes each connected to the repeating device by way of a communication medium. The repeating device further provides for a relatively shorter average media access latency than that provided by a prior art repeating device for a CSMA/CD LAN supporting greater than 15 nodes each connected to the repeating device by way of a communication medium.

2. Description of the Related Art

Ethernet and IEEE 802.3 are Local Area Network (LAN) standards that utilize the well known Carrier Sense, Multiple Access with Collision Detection (CSMA/CD) Media Access Control (MAC) protocol. The CSMA/CD MAC protocol provides an access method by which nodes connected to a shared communication medium may access the medium. Nodes are physically connected to the shared communication medium by way of what is commonly referred to as a Network Interface Card (NIC) or adapter. In a CSMA/CD LAN, a node's adapter contains means for communicating with other nodes according to the CSMA/CD MAC protocol. Two types of adapters are commonly utilized in CSMA/CD LANs: Ethernet adapters and IEEE 802.3 adapters. An Ethernet adapter supports transmitting and receiving Ethernet data packets in accordance with the CSMA/CD protocol, whereas an IEEE 802.3 adapter supports transmitting and receiving IEEE 802.3 data packets in accordance with the CSMA/CD protocol.

The initial communication medium used in a CSMA/CD LAN was a shared coaxial cable to which all nodes were attached in a bus topology. 10BASE5 and 10BASE2 provide the IEEE 802.3 Physical Layer specifications for a 10 million bits per second (Mbps) CSMA/CD LAN over coaxial cable. (See IEEE 802.3 clauses 8 and 10.) Such LANs were extended by connecting multiple communication medium segments together through one or more repeaters. However, the standards have evolved such that, today, a LAN is typically comprised of one or more hubs each providing a point-to-point connection to one of a plurality of nodes via a communication medium, such as twisted pair telephone wiring or fiber-optic cable, in a star wired topology. 10BASE-T and 10BASE-F provide the IEEE 802.3 Physical Layer specifications for a 10 Mbps CSMA/CD LAN over twisted pair wiring and fiber optic cable, respectively. (See IEEE 802.3 clauses 14 and 15.)

A repeating device such as a repeater or hub provides repeating functionality between the nodes connected to the repeating device. Hereafter, the term repeater will be used to refer to the repeating device but it is understood that the term repeater as used herein includes both repeater and hub devices. The repeater connects multiple communication medium segments to form a single shared communication medium in which all nodes on all of the communication medium segments are peers such that only one node may successfully transmit a data packet at a time. Since the repeater provides a common shared communication medium between all communication medium segments connected to the repeater, when any two or more nodes in the LAN attempt to transmit a data packet simultaneously, a collision occurs according to the CSMA/CD MAC protocol. Thus, in a CSMA/CD LAN utilizing one or more repeaters, all nodes in the LAN are said to be in the same collision domain. Each node involved in a collision stops transmitting their data packet and waits a period of time known as the backoff time before attempting to retransmit the same data packet. Each node determines its backoff time from a random number generator. If a node detects a collision on 16 consecutive retransmission attempts, then the data packet is discarded.

CSMA/CD LANs have had tremendous commercial success in the data communications market. However, one of the limitations of such LANs is the random backoff time that occurs when a node detects a collision according to the CSMA/CD MAC protocol. The media access latency experienced by a node in a CSMA/CD LAN, i.e., the delay incurred in an adapter receiving a data packet from a node and actually transmitting the data packet on to the medium, can be extremely variable and potentially very long depending on the random backoff time. Indeed, the media access latency may be infinite if the data packet is discarded due to excessive collisions.

Because a data packet may be discarded by a node in a CSMA/CD LAN due to excessive collisions, CSMA/CD LANs are said to be non-deterministic, indicating delivery of data is not guaranteed. The non-deterministic aspect of the access method employed by CSMA/CD LANs has limited the market acceptance of such LANs for delay sensitive applications such as factory automation, process control, real time voice and video traffic, and interactive multimedia.

What is needed is a LAN employing a media access method that guarantees delivery of data. Such an access method is said to be a deterministic access method because the maximum media access latency that a node may experience can be definitively determined. Prior attempts to provide for a deterministic media access method for nodes in a CSMA/CD LAN have focused on two approaches: (i) modify the random backoff time algorithm in the adapter associated with a node in order to coordinate retransmission attempts between nodes in a manner that reduces the likelihood of a particular node experiencing multiple consecutive collisions; and (ii) modify both the repeater(s) in the LAN and the adapter in each node so that collisions are avoided. The latter approach necessarily requires using means other than the CSMA/CD MAC protocol to arbitrate for the communication medium.

A number of the prior art methods and apparatus addressing the non-deterministic limitations of the CSMA/CD MAC protocol have centered around modifying the random backoff time algorithm utilized by the adapter installed in the nodes coupled to the LAN. The modified backoff time algorithms include the: (i) Binary Logarithmic Access Method (BLAM); (ii) Capture Avoidance Binary Exponential Backoff (CABEB) developed by Digital Equipment Corporation (DEC); and (iii) Priority Access Controlled Ethernet (PACE) developed by 3Com Corporation.

A disadvantage of the prior approaches to providing a deterministic media access method in a CSMA/CD LAN is that they require modifying the CSMA/CD MAC protocol as implemented in the adapter associated with each node in the LAN. Modifying the CSMA/CD MAC protocol creates its own set of problems. First, an adapter for use in a CSMA/CD LAN is manufactured according to an international standard (IEEE 802.3 and ISO 8802.3 ) or the de facto Ethernet standard, both of which specify use of the CSMA/CD MAC protocol. Therefore, any deviation from the standards involving modification of the CSMA/CD MAC protocol is likely to violate the standards and is thus likely to cause interoperability problems for nodes in which an adapter having a modified CSMA/CD MAC protocol is installed. For example, a node having an adapter operating in accordance with the CSMA/CD MAC protocol as specified by the IEEE 802.3 standard may not be able to communicate with a node having a non-standard adapter operating in accordance with a non-standard media access control protocol. Additionally, there is a very significant installed base of nodes having Ethernet and/or IEEE 802.3 compliant adapters that do not have the modifications necessary to provide deterministic access, and thus cannot benefit from the prior approaches. Therefore, what is needed is a deterministic access method for a CSMA/CD LAN that does not require modifying the CSMA/CD MAC protocol in a node's adapter.

Recently, the concept of a buffered repeater has been presented at study group meetings of the IEEE 802.3 standards Working Group by a representative of Packet Engines, Incorporated, as part of a collaborative effort involving several companies. Although both the preferred embodiment of the present invention and the buffered repeater buffer data, they differ significantly in both their objectives and their operation. The objective of the prior art buffered repeater is to extend the maximum distance between a node and a repeater in CSMA/CD LAN without increasing the slot time parameter of the LAN, but does so by removing the CSMA/CD MAC protocol in the adapter at the node, whereas an object of the present invention is to control media access latency for a node without modifying the MAC protocol utilized by the adapter in the node.

Thus, what is needed is a method and apparatus for a node to access the medium in a CSMA/CD LAN that does not require modifying the backoff algorithm or any other component of the adapter in the node. Furthermore, what is needed is a repeater that provides deterministic access in a CSMA/CD LAN for up to and including 15 nodes, and a relatively shorter average communication media access latency than possible in the prior art for a CSMA/CD LAN with more than 15 nodes.

SUMMARY OF THE INVENTION

The present invention is a repeater such as a repeater or hub, as utilized in a Carrier Sense Multiple Access with Collision Detection (CSMA/CD) based LAN, that provides deterministic access to a shared communication medium for a limited number of nodes (15 or less), and improves the nondeterministic access latency for 16 or more nodes (up to the maximum number of nodes allowed to be coupled to the repeater) without requiring any modification to the Network Interface Card (NIC) or adapter in each of the nodes.

Prior art repeaters are passive in the CSMA/CD media access control method. A port on a prior art repeater simply receives signals transmitted on a communication medium segment to which it is connected and repeats the signals to all other ports in the repeater. Each of these ports, in turn, transmit the signals on to the communication medium segments to which they are connected. A prior art repeater detects a collision, and ensures each node connected to repeater detects the collision, but does not control the occurrence of a collision in any way. In this respect, the prior art repeater is a passive device. Indeed, a prior art repeater forwards all incoming signals, whether they represent data packets, collision fragments, jam signals, or just noise. The repeater embodied by the present invention, however, takes an active role by preventing one of the nodes involved in a collision from detecting that a collision has occurred so that the node continues transmitting a data packet, while the other nodes involved in the collision backoff and attempt to retransmit their data packets at a later time. In essence, the repeater selects a node to continue transmitting a data packet in spite of a collision involving the node. Furthermore, when selecting which node shall continue transmitting, the repeater of the present invention gives priority to the node with the currently highest number of outstanding packet retransmission attempts. This reduces the average media access latency experienced by the nodes, and eliminates a well-known problem with the CSMA/CD MAC protocol known as the Capture Effect. Importantly, since the CSMA/CD MAC protocol embodied in the adapter in each node is unmodified, no deviation from the international standard IEEE 802.3 or the de facto Ethernet standard is required to practice the present invention. Moreover, the present invention is interoperable with all nodes having an adapter that operates in accordance with either standard.

There are several components of the repeater embodied in the present invention which independently improve the media access latency for nodes in a CSMA/CD LAN. Together, these components of the repeater allow the present invention to guarantee deterministic access to the communication medium for 15 or fewer nodes connected to the repeater, as discussed below.

The repeater of the present invention prevents a node involved in a collision from detecting that the collision occurred, and transmits the data packet received from that node to all other nodes connected to the repeater. The repeater accomplishes this by repeating the data packet received from that node during the collision, and discarding the data packets received from other nodes, thereby improving the performance of a CSMA/CD LAN by allowing a valid data packet to traverse the repeater and all communication medium segments attached thereto notwithstanding that a collision occurred.

The present invention further provides for the repeater to maintain a count of the collisions and retransmission attempts experienced by each node since that node's last successful data packet transmission. The count is used to prioritize which of the nodes involved in a subsequent collision will be allowed to continue to transmit. Prioritization is useful in reducing any disparity in the number of retransmission attempts experienced by each node, thereby reducing the likelihood of a node dropping a data packet as occurs when the maximum number of retransmission attempts for such node is reached.

When multiple nodes are waiting for another node to finish transmitting a data packet so that they can each attempt to begin transmitting a data packet (i.e., when multiple nodes are waiting until a carrier signal is no longer sensed), the time at which their data packets arrive at the repeater will vary according to the varying lengths of the communication medium between each of the nodes and the repeater. For the repeater to arbitrate among the nodes that begin transmitting, it is useful to receive the data packets from each of the nodes at the same time. Thus, the present invention provides a mechanism for automatically equalizing the transmission delay incurred due to the length of the communication medium from each node to the repeater. The present invention also provides an alternate method of accounting for the varying delay incurred due to varying cable length between each of the nodes and the repeater. The repeater buffers the data packet received from each node (or at least from whichever node currently has the highest priority) until sufficient time has elapsed to begin receiving a data packet from each node that is attempting to transmit a data packet during the current arbitration interval.

For each node, the repeater maintains a slot time counter which models the slot time counter for the adapter installed in or associated with that node. The backoff time following a collision is measured in increments of a slot time, so modeling the slot time counter for the adapter in a node allows the repeater to predict when it will receive a data packet from a node that is currently backed off. When a node has an opportunity to attempt transmitting a data packet at each slot time, the repeater determines if that node is going to attempt to transmit a data packet before making a final arbitration decision as to which node will be allowed to successfully transmit a data packet.

One of the advantages of the present invention is that it controls the media access latency for a node in a CSMA/CD LAN without requiring modification of the node's adapter. Additionally, the present invention allows one valid data packet to be transmitted during each collision, which eliminates wasted bandwidth during collisions and reduces the average number of retransmission attempts experienced by a node in the LAN. The present invention gives nodes with the highest number of retransmission attempts the highest priority when determining which node shall transmit a valid data packet during a collision. This reduces the probability of a node dropping a data packet due to excessive retransmission attempts, and dramatically reduces the average media access latency for nodes in the CSMA/CD LAN. For CSMA/CD LANs with 15 or fewer nodes, the present invention guarantees that data packets will not be dropped due to excessive retransmission attempts, thereby providing nodes with deterministic access to the medium to which they are connected.

BRIEF DESCRIPTION OF THE DRAWINGS

The present invention is illustrated by way of example and not limitation in the following figures. Like references indicate similar elements, in which.

DETAILED DESCRIPTION OF THE EMBODIMENTS OF THE INVENTION

Figure 1:
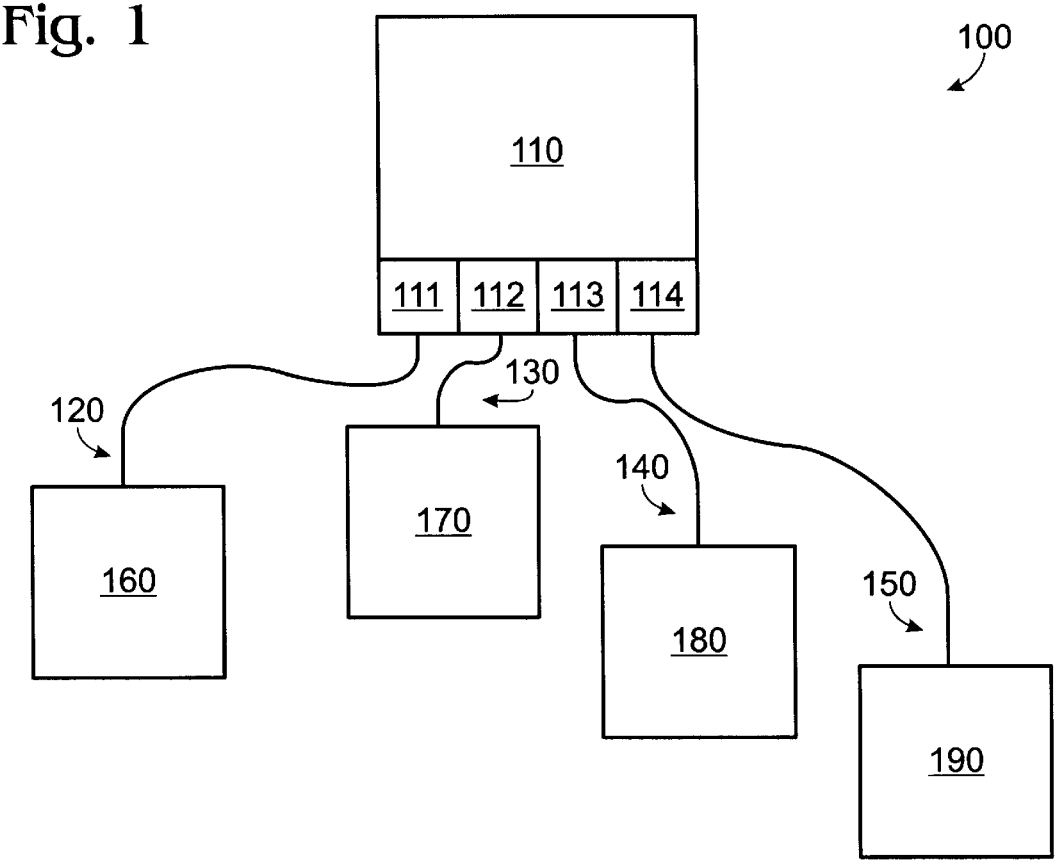
FIG. 1 illustrates a LAN in which may be utilized the present invention.

The present invention is a repeater providing for deterministic access in a Local Area Network (LAN) utilizing the CSMA/CD medium access method. In the following description, numerous specific details are set forth in order to provide a thorough understanding of the present invention. It will be apparent, however, to one of ordinary skill in the art that the present invention may be practiced without these specific details. In other instances, well-known architectures, circuits, and techniques have not been shown to avoid unnecessarily obscuring the present invention.
CSMA/CD Operation and Definitions In describing the operation of the present invention, it is helpful to begin with a review of the CSMA/CD MAC protocol and related terminology. A node is generally a computer system providing a user with access to the LAN or services for such user over the LAN. Thus, a node may be a client, server, workstation, bridge, switching hub, router, etc.

A node has at least one interface card, typically referred to as a Network Interface Card (NIC) or adapter, for connecting the node to the LAN and for transferring data to and from the LAN. More specifically, the adapter contains a Medium Attachment Unit (MAU) for physically connecting the adapter to a communication medium. When a node has a data packet to transmit, the adapter determines whether another node is currently transmitting on the LAN by checking for the presence of a carrier signal from the MAU. A carrier signal is sensed if at least one node is currently transmitting on the communication medium. If the LAN is idle, i.e., no nodes are currently transmitting on the communication medium, a node can begin transmitting a data packet immediately. If the LAN is busy, however, the node will defer until the current transmission completes and then begin transmitting a data packet after a fixed Inter-Packet Gap (IPG) time interval, e.g., 9.6 microseconds in a 10 Mbps CSMA/CD LAN.

When two or more nodes begin transmitting a data packet at the same time, a collision occurs. When a node detects a collision, it continues to transmit for a period of time to ensure all other nodes in the LAN detect the collision as well. This period of time is known as the jam time and the transmission that occurs during the jam time is known as a jam signal. After a node sends a jam signal for the duration of the jam time, the node then stops transmitting and backs-off for some time period prior to attempting to retransmit the data packet. The backoff time interval is determined by a random number selected from a range of numbers. The range increases by a factor of two for each retransmission attempt. If the number of retransmission attempts for a particular node reaches 16, the data packet is discarded due to excessive collisions. Importantly, each node involved in a collision is unsuccessful in transmitting a data packet. All such nodes must retransmit their respective data packet.

In saying that a collision occurs when two or more nodes transmit "at the same time", there is actually a window or period of time during which two or more nodes can begin transmitting a data packet and cause a collision to occur. The size of the window depends on the maximum propagation time for a signal transmitted by a node to be received by all other nodes in the same collision domain. The maximum end to end propagation time is that amount of time for a signal transmitted by a node at one end of the communication medium to reach a node at the other end of the communication medium. The propagation time accounts for the time required for a signal to travel through adapters, the communication medium, and one or more repeaters. The IEEE 802.3 standard defines a constant time interval known as the "slot time" to represent the worst case round trip propagation time between any two nodes in a maximum size LAN. (Slot time is measured in bit times so that it scales with the speed of the LAN, wherein one slot time equals 512 bit times in a 10 or 100 Mbps CSMA/CD LAN.) In fact, the slot time must be larger than the sum of the round-trip propagation time and the jam time.

To operate properly, a CSMA/CD LAN must be designed such that the worst case delay for a node to receive a signal transmitted from another node does not exceed one half slot time. It is thus appreciated that the slot time is a critical parameter for determining when and how collisions may occur. The backoff interval during which a node waits before attempting to retransmit a data packet following a collision is measured in slot time multiples.

Transmitting Through a Collision

The present invention recognizes that present methods of wiring Ethernet and IEEE 802.3 LANs have eliminated the necessity of having all nodes cease transmitting when a collision occurs. The repeater of the present invention selects one node to continue transmitting when a collision occurs.

Initially, Ethernet and IEEE 802.3 LANs utilized a shared coaxial cable known as 10BASE5 or 10BASE2 (depending on the type of coaxial cable) as the communication medium to which all nodes were attached in a bus topology. When two or more nodes transmitted a data packet on the cable at the same time, the data packets interfered with each other such that they prevented the nodes from detecting a valid data packet on the cable. Therefore, when a collision was detected, all nodes were required to stop transmitting and attempt transmitting a data packet at a later time.

With the advent of 10BASE-T wiring, the shared coaxial cable was replaced by a set of point-to-point cables connecting each node individually to a port on a repeater such as a hub or repeater. For example, with reference to FIG. 1, a LAN 100 is illustrated in which a repeater 110 is respectively connected via point to point communication medium segments 120, 130, 140 and 150 to nodes 160, 170, 180 and 190. The repeater has multiple ports, each for connecting a node to repeater 110 via one of the communication medium segments. For example, port 111 connects repeater 110 to node 160 via communication medium segment 120, and port 112 connects repeater 110 to node 170 via segment 130. Likewise ports 113 and 114 connect repeater 110 to nodes 180 and 190 via segments 140 and 150, respectively. In this way, repeater 110 can forward a data packet received from any of nodes 160 through 190 to all of the other nodes.

Figure 4:
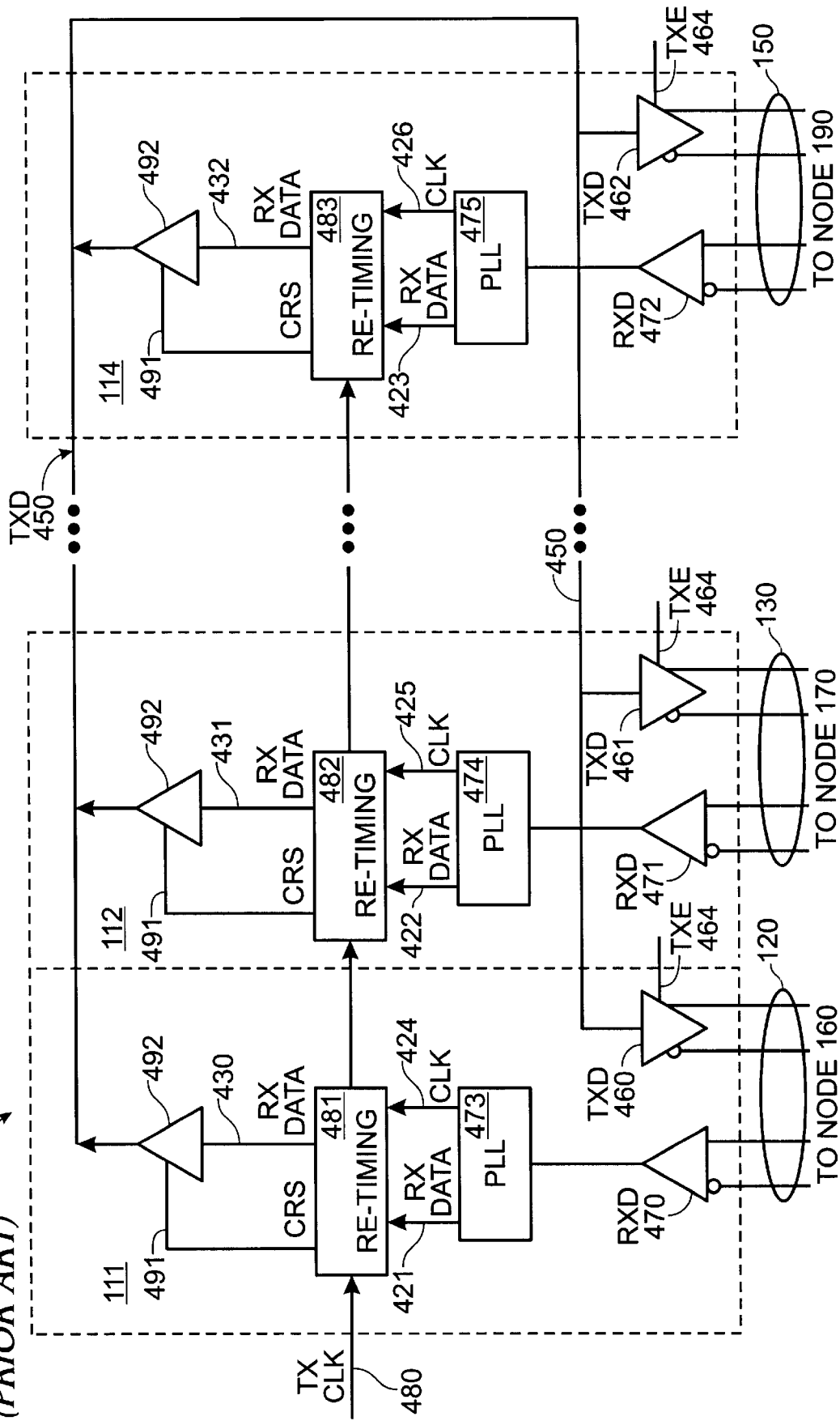
FIG. 4 is a block diagram of a prior art repeater.

10BASE-T wiring provides a transmit pair and a receive pair of wires so that data packets being transmitted and received over the same point to point connection do not interfere with each other. Each pair operates as a separate channel for the transmission of a data packet. This is illustrated in FIG. 4, wherein communication medium segments 120, 130 and 150 are shown comprising both a transmit data channel and a receive data channel. A collision is detected by a 10BASE-T adapter in a node by sensing the simultaneous transmission of a data packet on the transmit channel and reception of a data packet on the receive channel, i.e., full duplex communication.

Thus, importantly, although the standard Media Access Control (MAC) sublayer functionality in a 10BASE-T adapter does not support full duplex functionality due to the collision detection circuitry therein, the 10BASE-T Physical layer specification for a 10 Mbps CSMA/CD LAN is capable of full-duplex operation, i.e., carrying data in both directions (to and from the node) simultaneously without corrupting data. (In fact, this full-duplex capability is implemented in the 100BASE-X Physical layer specification for a 100 Mbps CSMA/CD LAN and corresponding adapters.)

Before considering the repeater of the present invention, it is useful to describe a prior art 10BASE-T CSMA/CD LAN repeater 110 as illustrated in FIG. 4. Prior art repeater 110 comprises multiple ports such as ports, 111, 112 and 114. For purposes of simplicity, only three ports are illustrated in FIG. 4, however, a fourth or more ports such as port 113 shown in FIG. 1 may be included in repeater 110. Each port is connected to a node via a communication medium segment comprised of two pairs of twisted pair telephone wiring: a receive pair and a transmit pair. Each pair operates as a separate channel. Each port has receive circuitry coupled to the receive channel for receiving data packets from the attached node and transmit circuitry coupled to the transmit channel for transmitting data packets to the attached node. For example, port 111 has receive circuitry 470 coupled to the receive channel of communication medium segment 120, and transmit circuitry 460 coupled to the transmit channel of the same segment. Each port further comprises a phase lock loop (PLL), e.g., PLL 473 in port 111, for recovering and separating a data and a clock signal from a received data packet.

A common internal transmit data (TXD) bus 450 receives data packets from each port and forwards the data packets out the ports. Additional circuitry not shown drives transmit enable (TXE) signal 464 so that a data packet received on a particular port is transmitted out all ports other than the port from which the data packet was received. The common internal transmit data TXD bus 450 operates in accordance with the transmit clock 480. Thus, retiming modules 481, 482 and 483 in each port synchronize the data packets received from each port to the transmit clock 480 before such data is placed on TXD bus 450. Each retiming module further detects carrier, which enables driving data received at the port on to TXD bus 450. For example, when retiming module 481 detects carrier on port 111, carrier sense (CRS) line 491 is asserted, thereby enabling logic 492, which then forwards the data received at the port through logic 492 to TXD bus 450, over which the data is then transmitted to the other ports. Although not supported by the circuitry in prior art repeater 110, each port is capable of full duplex communication because the communication medium segment attached to each port is comprised of a separate transmit and receive pair, or channel.

The repeater of the present invention takes advantage of full duplex capability in a 10BASE-T CSMA/CD LAN by selecting a node to continue transmitting a data packet, and causing the repeater to forward the data packet to all other nodes without corrupting the data packet, even when a collision has occurred. When a collision occurs, the repeater discards data packets received from all nodes other than the selected node. Thus, the selected node does not receive any data packets from the other nodes and therefore fails to detect that a collision has occurred. The other nodes receive the data packet from the selected node as a valid data packet while they are transmitting a data packet, causing them to detect a collision, backoff and attempt to transmit their respective data packet at a later time.

Figure 5:
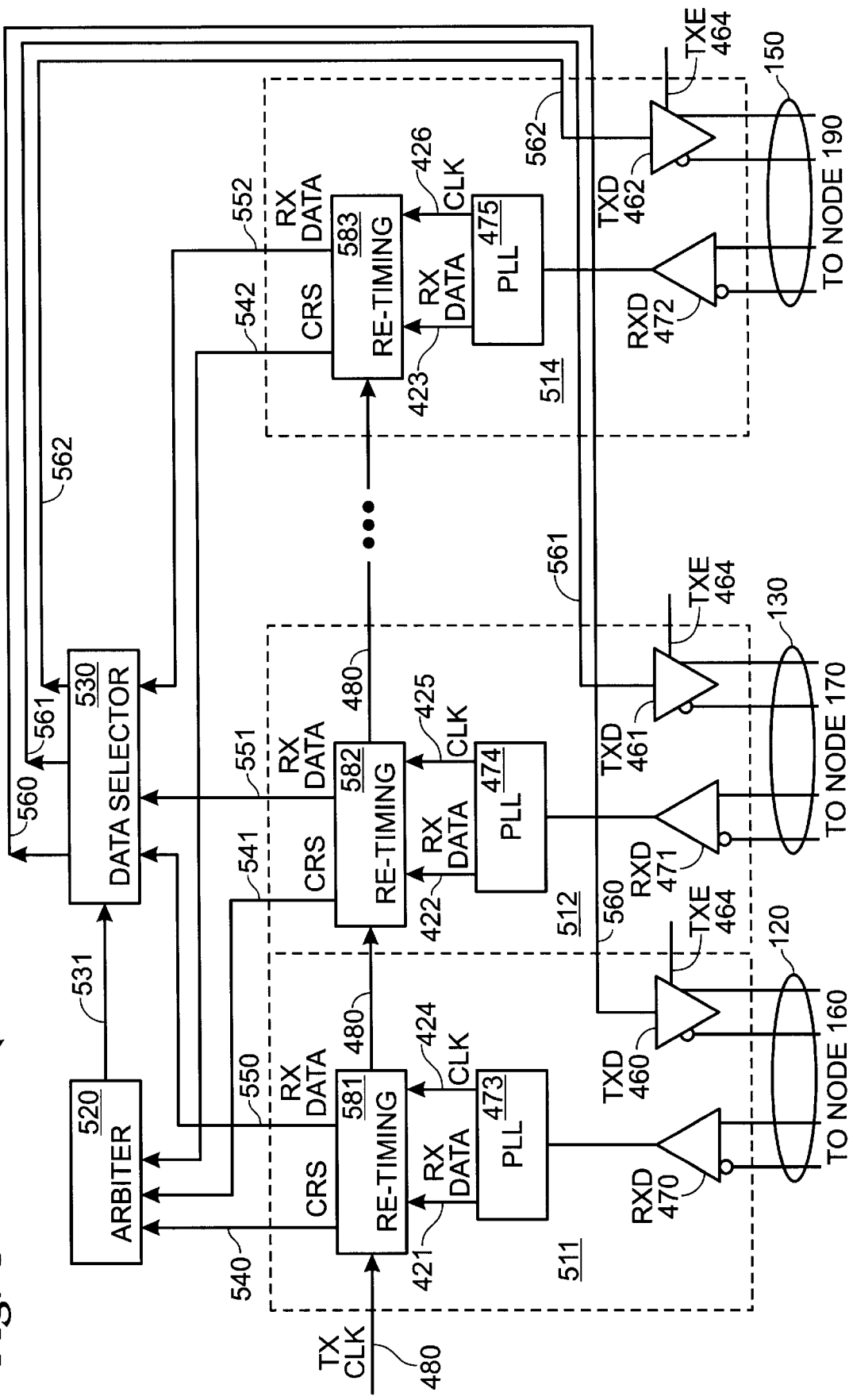
FIG. 5 is a block diagram of an embodiment of the repeater of the present invention.

FIG. 5 illustrates a repeater 510 of the present invention, in which a valid data packet is transmitted by a selected node and forwarded by the repeater during a collision. Repeater 510 includes central arbitration circuitry, illustrated as arbiter 520, and a data selector 530 in addition to the components and functionality described above in connection with prior art repeater 110. Carrier sense (CRS) lines 540, 541 and 542, from ports 511, 512 and 514, respectively, are provided as input to arbiter 520. Additionally, receive data lines 550, 551 and 552 from ports 511, 512 and 514 are provided as input to data selector 530.

Arbiter 520 determines which of the ports is receiving a data packet by detecting the assertion of the carrier sense lines provided as input to the arbiter. If multiple ports sense carrier simultaneously, arbiter 520 determines which one of the ports has priority according to an some arbitration method (see discussion below) and outputs a signal over select line 531 that causes data selector 530 to select an input from receive data lines 550, 551 or 552. Data selector 530 outputs the data packet received from such receive data line on all transmit data lines except the transmit data line corresponding to the same port from which the receive data line was selected. For example, if ports 511 and 512 each receive a data packet simultaneously, both carrier sense line 540 output from port 511 and carrier sense line 541 output from port 512 are asserted. Arbiter 520 selects between port 511 and 512 based on an arbitration method. For example, suppose arbiter 520 selects between port 511 and 512 by considering the number of retransmission attempts by the node connected to each port.

Upon selecting a arbitration winner, for example, node 160 connected to port 511, arbiter 520 sends a signal over select line 531 indicating to data selector 530 from which receive data line, 550 or 551, to receive a data packet. In the example, data selector 530 begins receiving a data packet from port 511 over receive data line 550 based on the signal output on select line 531. Data selector 530, in turn, begins to transmit the data packet being received from port 511 to port 512 and port 514 by forwarding the data packet on transmit data lines 561 and 562, respectively. Importantly, data selector 530 does not send the data packet received on port 511, nor the data packet received on port 512, to transmit data line 560, so a collision does not occur at node 160 connected to port 511. In this way, the present invention provides for the ability to transmit a valid data packet by avoiding a collision that would have otherwise occurred. That is, node 160 connected to port 511 is prevented from detecting that a collision occurred and therefore completes transmission of the data packet.

Note, however, node 170 connected to port 512 does detect that a collision occurs because, in this example, as described above, a data packet is being received at port 512 from node 170 as the data packet received from node 160 is being transmitted, via line 561, out port 512 to node 170. Node 170 therefore stops transmission of its data packet and goes into backoff. In this manner, node 170 connected to port 512 and node 190 connected to port 514 receive a valid data packet from node 160 connected to port 511.

Figure 6:
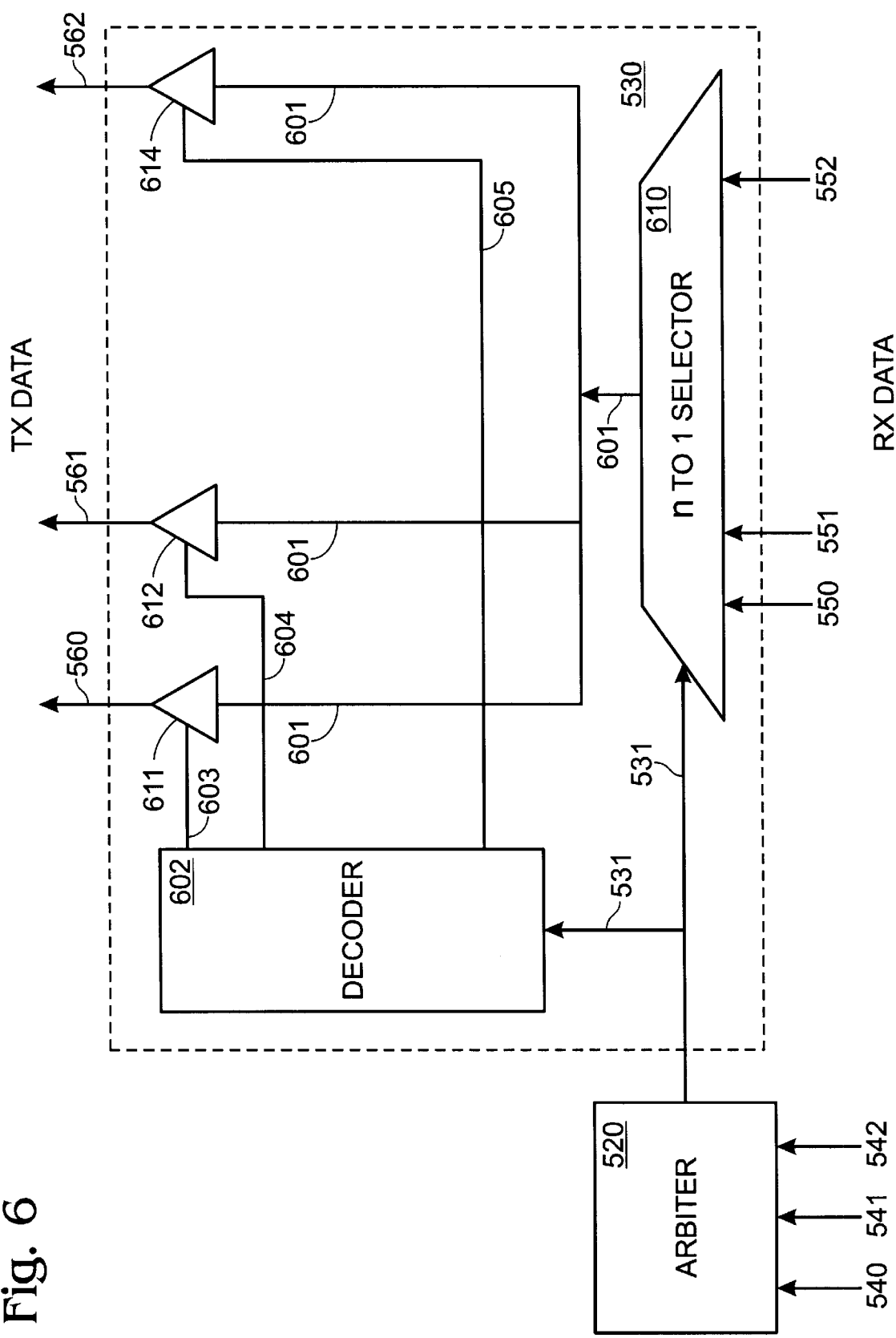
FIG. 6 is a block diagram of certain aspects of logic in an embodiment of the repeater of the present invention.

FIG. 6 provides further detail of data selector 530. A plurality of receive data lines, one from each retiming module corresponding to a port in repeater 510, e.g., receive data lines 550–552, are coupled to the input of an n-way selector 610. N-way selector 610 selects one of the receive data lines as input based on a signal received over select line 531 from arbiter 520. In the event multiple packets are being received concurrently by repeater 510, arbiter 520 applies an arbitration scheme to determine from which receive data line to select a packet, e.g., based on the number of retransmission attempts by a node corresponding to the port from which a data packet is received. N-way selector outputs a data packet onto line 601, which is provided as input to logic 611, 612 and 613. Logic 611, 612 and 613 forward the data packet to ports 511, 512 and 514 respectively over lines 560, 561 and 562. However, decoder 602 also receives select line 531 as input from arbiter 520 and enables all logic based thereon other than the logic gating transmission of the data packet to the port from which the data packet was received. For example, if a data packet is received on ports 511 and 512 and arbiter 520 arbitrates to receive the data packet received on port 511, then arbiter 520 sends a signal over select line 531 causing n-way selector 610 to select receive data line 550 (corresponding to port 511) as input. The data packet from port 511 is forwarded to each of logic 611, 612 and 613. Decoder 602, having also received the signal sent by arbiter 520 over select line 531, enables logic 612 and 614, but not logic 611, so that ports 512 and 514 transmit the data packet received from node 160 (attached to port 511) to nodes 170 and 190 (respectively attached to ports 612 and 614).

Alternatively, data selector 530 transmits a data packet out each of lines 560, 561 and 562 and decoder 602 is coupled to and drives a signal on transmit enable lines associated with the transmit logic in each port, e.g., TXE line 464. It will be appreciated by those of skill in the art, however, that implementations other than those described with respect to FIGS. 5 and 6 may be utilized without departing from the spirit and scope of the present invention.

Repeater Arbitration Method

Figure 8:
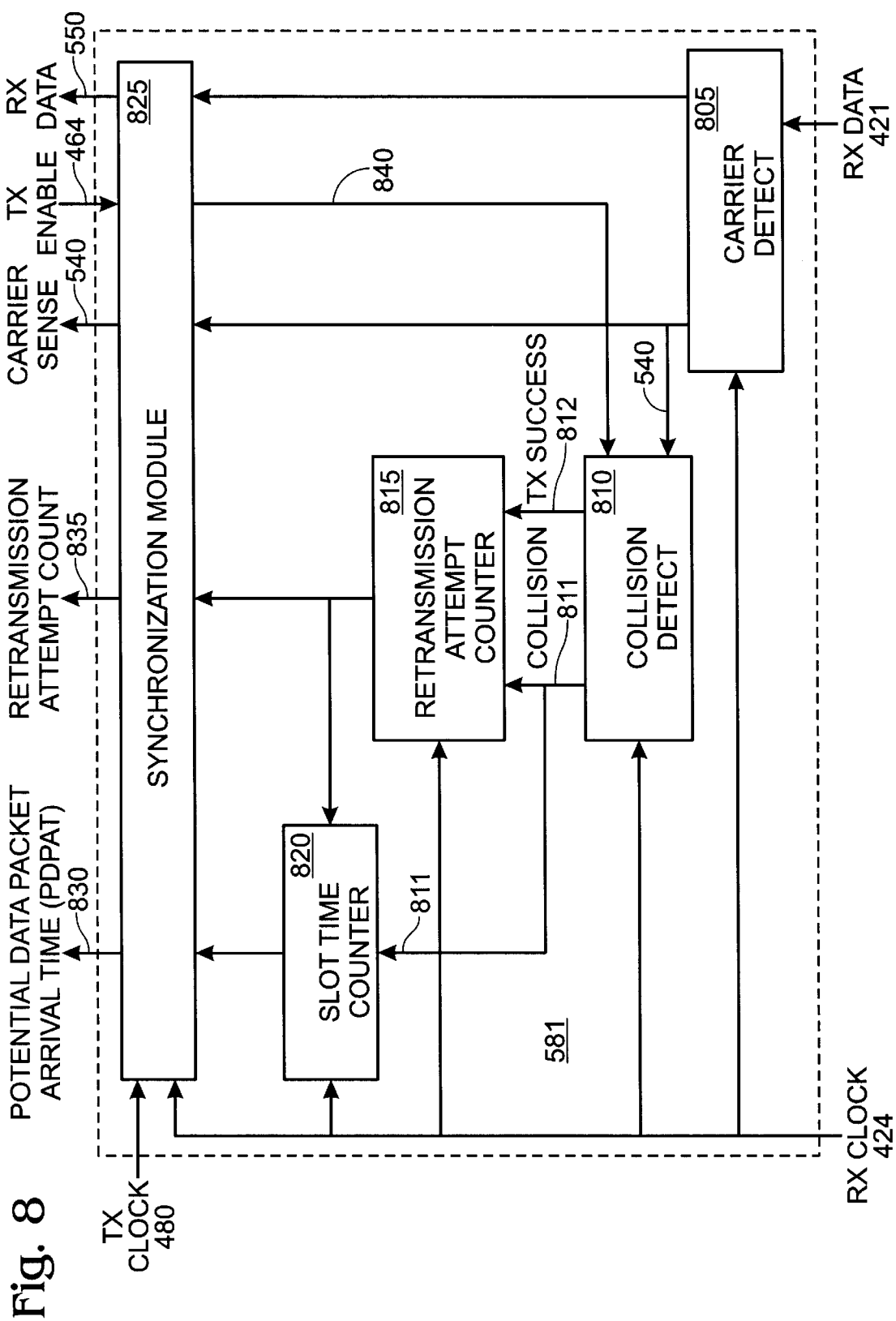
FIG. 8 is a block diagram of certain aspects of logic in a retiming module as utilized by an embodiment of the repeater of the present invention.

In making a forwarding decision, the present invention gives priority to data packets received from nodes with the most retransmission attempts since their last successful transmission of a data packet. With reference to FIG. 8, The repeater 510 embodied in the present invention associates a retransmission attempt counter with each port. For example, FIG. 8 illustrates a retransmission attempt counter (RAC) 815 in the retiming module 581 of port 511. The RAC is reset to an initial value, e.g., zero, whenever the node connected to the port 511 associated with the RAC successfully transmits a data packet. The RAC is incremented each time the node connected to the port experiences a collision.

The repeater detects that a node has experienced a collision when the repeater receives a fragment of a transmission from the node while the repeater is forwarding a data packet to the node. The repeater selects the node with the highest retransmission attempt counter value to continue transmitting through a collision. Should two or more nodes have the same RAC value, the repeater selects a node based on an arbitration scheme such as round-robin, least recent transmission or least recent attempted transmission.

For example, with reference to FIG. 8, retiming module 581 in port 511 comprises retransmission attempt counter 815. When port 511 is transmitting a data packet, transmit enable (TXE) line 464 is asserted and provided as input to collision detect logic 810. If at the same time, a data packet is being received on port 511 via receive data line 421, carrier detect logic 805 forwards the data packet so received on to data selector 530 via receive data line 550 and, importantly, notifies collision detect logic 810 via carrier sense line 540. Collision detect logic, having both transmit enable line 464 and carrier sense line 540 asserted concurrently, detects a collision and notifies retransmission attempt counter 815 via collision detect line 811. The value maintained in RAC 815 is thereby incremented by one. RAC 815 outputs the present value maintained therein on RAC line 835, which may be provided as input to, for example, arbiter 520. RAC 815 in port 511, as well as other RACs in other ports in repeater 510, provide such input to aid arbiter 520 in determining from which port repeater 510 should receive a data packet for forwarding to the other ports.

With further reference to FIG. 8, when port 511 successfully receives a data packet transmitted by node 160, RAC 815 is reset, e.g., to zero. In particular, if carrier sense line 540 is asserted and then unasserted while transmit enable line 464 remains unasserted, collision detect logic 810 recognizes a data packet was successfully transmitted by node 160 and received by port 511. Accordingly, transmit success line 812 is asserted thereby resetting RAC 815.

Arbitration Windows

As noted earlier, a collision occurs when two or more nodes each begin transmitting a data packet within a time interval dependent on the worst case end to end propagation time across the LAN. In a CSMA/CD LAN, this time interval is one half the slot time of the LAN. To effectively arbitrate between nodes, the repeater should determine which nodes will attempt to transmit a data packet within a given one half slot time interval, hereafter referred to as the "arbitration window." The present invention provides a means for a repeater to predict which nodes will transmit a data packet and in some cases control the reception of data packets transmitted from such nodes.

With reference to FIG. 1, a LAN 100 is illustrated in which a repeater 110 is respectively connected via point to point communication medium segments 120, 130, 140 and 150 to nodes 160, 170, 180 and 190. The repeater has multiple ports, each for connecting a node to repeater 110 via one of the communication medium segments. For example, port 111 connects repeater 110 to node 160 via communication medium segment 120, and port 112 connects repeater 110 to node 170 via segment 130. Likewise ports 113 and 114 connect repeater 110 to nodes 180 and 190 via segments 140 and 150, respectively. In this way, repeater 110 can forward a data packet received from any of nodes 160 through 190 to all of the other nodes. Likewise, repeater 510 of the present invention, having ports 511–514 as illustrated in FIG. 5, operates in a similar manner.

In the particular example set forth in FIG. 1, communication medium segments 120 and 150 respectively connecting nodes 160 and 190 to repeater 110 are substantially the same length and together with repeater 110, form a communication medium whose length is equal to the maximum length allowed by the IEEE 802.3 Physical layer specification for a CSMA/CD LAN. Thus, the round trip propagation delay between nodes 160 and 190 is equivalent to the slot time of LAN 100. It is therefore appreciated that the end to end propagation delay between node 160 and node 190 is one half slot time, and the propagation delay between repeater 110 and either node 160 or node 190 is one quarter slot time. Node 180, however, is connected to repeater 110 via a relatively shorter length communication medium segment 140. Likewise, node 170 is connected via an even shorter length segment 130. Thus, the round trip propagation delay between node 170 or 180 and any other node is less than the slot time of LAN 100.

Figure 2:
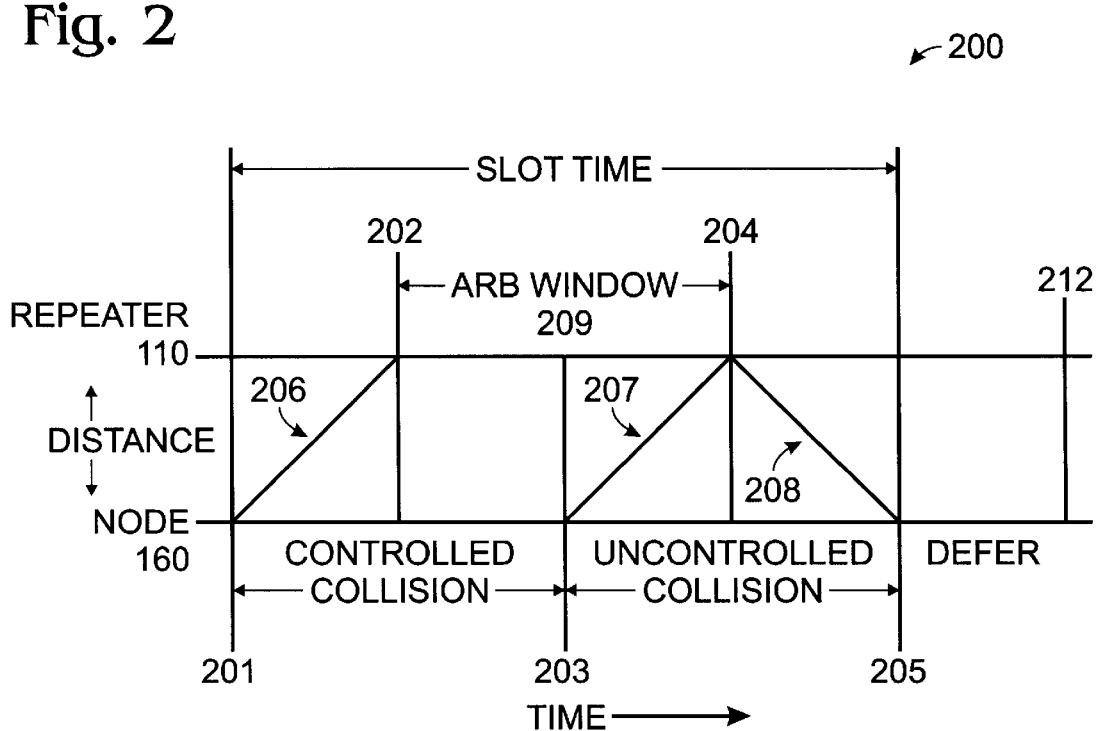
FIG. 2 shows a "time-space diagram" of a communication medium segment between a node and a repeater as embodied in the present invention.

FIG. 2 shows a time-space diagram 200 of node 160 and repeater 510 as embodied by the present invention (which, for example, may replace repeater 110 in the network illustrated in FIG. 1) connected via point to point communication medium segment 120. The horizontal axis in the diagram indicates propagation time, in which time progresses horizontally from left to right. The vertical axis indicates distance along the length of segment 120 between node 160 and repeater 510. If node 160 begins transmitting a first data packet at time 201, the first data packet begins to arrive at repeater 510 at time 202, as indicated by the slope of line 206. This delay is attributed to the propagation time involved in node 160 transmitting the first data packet along the length of communication medium segment 120 connecting node 160 to repeater 510. Likewise, if node 160 begins transmitting a second data packet at time 203, the second data packet begins to arrive at repeater 510 at time 204, as indicated by the slope of line 207. Finally, if repeater 510 begins forwarding a third data packet at time 204, the third data packet begins to be received at node 160 at time 205, as indicated by the slope of line 208.

The time interval between time 201 and time 203 represents the round-trip propagation time of communication medium segment 120 connecting node 160 and repeater 510. Likewise, the time interval between 201 and 205 represents two round-trip propagation times for communication medium segment 120. It is appreciated that the propagation time between node 160 and repeater 510 is dependent on factors such as the transmission speed and length of the communication medium connecting node 160 to the repeater. Given the length of communication medium segment 120 in the example point to point network set forth above, (i.e., a maximum length segment under CSMA/CD guidelines) the round trip propagation time of segment 120 is equivalent to one half slot time of LAN 100, and two round trip propagation delays of segment 120 is equivalent to the slot time of LAN 100.

Figure 7:
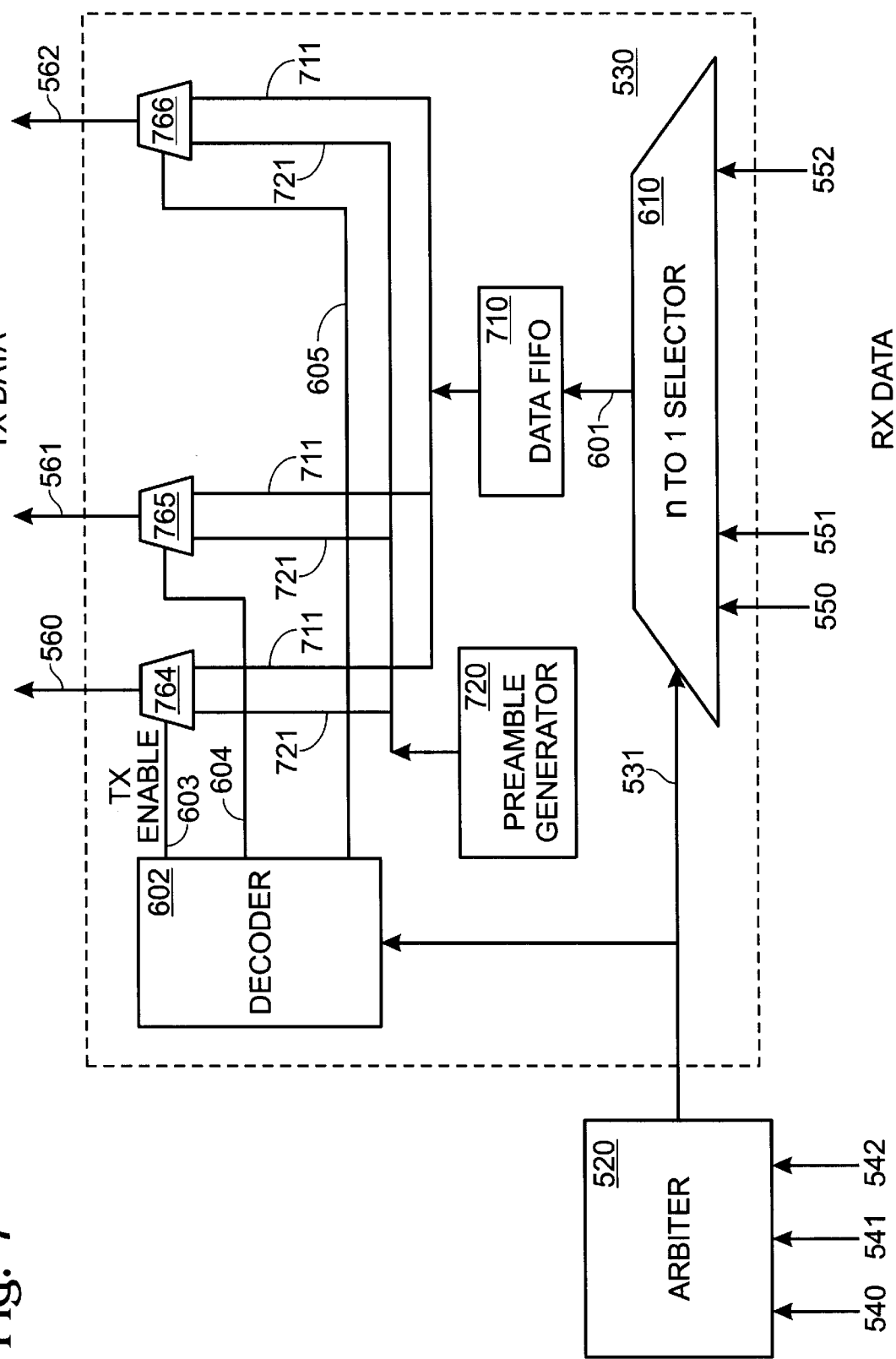
FIG. 7 is a block diagram of additional aspects of logic in an embodiment of the repeater of the present invention.

In FIG. 2, repeater 510 establishes an arbitration window 209 between times 202 and 204. With reference to FIG. 7, during this time interval, repeater 510 buffers a data packet being received from whichever node is a potential arbitration winner, according to, for example, the value of the retransmission attempt counter associated with the port to which the node is connected, into First In First Out (FIFO) data buffer 710. At the end of arbitration window 209, repeater 510 determines which node has priority based on, for example, the retransmission attempt counter associated with the node, and begins forwarding the data packet from that node to all other nodes at time 204.

If a node begins transmitting a data packet between times 201 and 203, the data packet begins to arrive at repeater 510 within arbitration window 209. The window between times 202 and 204 is characterized as a controlled collision region because repeater 510 controls whether to begin forwarding a data packet transmitted by a node or intentionally cause a collision to occur with the node by forwarding data to it, e.g., a data packet received from another node or preamble generated by preamble generator 720. At the end of arbitration window 209 (i.e., at time 204), repeater 510 begins to forward a data packet from the node that is selected as the arbitration winner to all other nodes.

If a node begins transmitting a data packet between times 203 and 205, the data packet begins to arrive at repeater 510 between times 204 and 212, after repeater 510 has started forwarding a data packet from the node that is selected as the arbitration winner to all other nodes in LAN 100. This region from time 204 to time 212 is characterized as an uncontrolled collision region because an attempted transmission by a node during this period is received by repeater 510 after arbitration window 209 is closed and during such time that repeater 510 is forwarding a data packet from the node that is selected as the arbitration winner to all other nodes. Thus, the data packet is not considered for forwarding by repeater 510. Indeed, the transmission from repeater 510 to the node during this period causes a collision at the node, forcing the node to stop transmitting the data packet and back off. However, if a node attempts transmitting a data packet after time 205, it senses carrier because repeater 510 is transmitting a data packet. In such case, the node defers transmitting a data packet until after carrier is no longer sensed.

A block diagram of an embodiment of the present invention is illustrated in FIG. 7, in which arbiter 520 and decoder 602 drive selector inputs 603, 604 and 605 to selectors 764, 765, and 766, respectively. The selectors determine whether to begin forwarding a data packet received from a corresponding port via one of receive data lines 550, 551 and 552, or send preamble generated by preamble generator 720 to cause a collision at a node or, if the node is not transmitting a data packet, to cause the node to defer transmission of a data packet until the receive data line coupled to the node is idle.

Uncontrolled collisions prevent repeater 510 from strictly adhering to the arbitration rule that whichever node has the highest retransmission attempt count wins the arbitration. Although repeater 510 cannot predict with complete accuracy when a data packet transmitted from a node will, in fact, arrive at repeater 510, it can predict likely times a data packet transmitted from the node will arrive by being cognizant of and recognizing the factors that determine when the node can transmit a data packet. In predicting likely times that it will receive a data packet transmitted from a particular node, repeater 510 can avoid uncontrolled collisions at such node before they otherwise occur. For example, if the node begins transmitting a data packet in the controlled collision region (between times 201 and 203), the data packet begins to be received by repeater 510 during arbitration window 209 and is included in the arbitration. If, however, it is likely the node will begin transmitting a data packet during the uncontrolled collision region (between times 203 and 205), then repeater 510 begins forwarding a data packet to this node at the beginning of arbitration window 209 (at time 202) to prevent the node from transmitting a data packet during the uncontrolled collision region. The data packet being forwarded by repeater 510 begins to arrive at the node at time 203 and causes the node to defer rather than initiate transmitting a data packet, thus avoiding the uncontrolled collision.

Given that a node has a data packet ready to transmit, there are generally three conditions when the node can indeed transmit the data packet on the communication medium to which it is connected: 1) on sensing the medium is idle, 2) after deferring to a transmission from another node, i.e., on sensing the medium is idle after previously sensing carrier on the medium and waiting for the medium to return to idle, and 3) on the expiration of the backoff timer for the node, after a collision occurs on the medium.

With respect to the first condition enumerated above, repeater 510 does not detect when the communication medium to which a node is connected is idle, and thus cannot avoid an uncontrolled collision at that node, as may occur if the node transmits while the repeater is forwarding a data packet to the node. This is not critical, however, because, under this first condition, the retransmission attempt counter associated with the port on repeater 510 that is connected to the node has a value of zero. Thus, the node would not likely win, nor is it critical for it to win, arbitration based on, for example, the number of retransmissions attempted by the node.

As for the second condition, repeater 510 does not necessarily know when a node is deferring, but it can predict when it might receive a data packet from the node if it assumes the node is presently deferring. Given the maximum propagation delay for a data packet to travel from a node to the repeater 510 due to the length of the communication medium segment connecting the repeater and the node, the potential arrival time at the repeater of the data packet transmitted from the node is within, at most, a one half slot time interval following an Inter-Packet Gap (IPG) which IPG, in turn, follows the transmission of the last data packet on the LAN.

Likewise, in connection with the third condition enumerated above, repeater 510 does not know when the backoff timer for a node is going to expire, but it does know that the backoff timer for a node expires some integer multiple of slot times after the node detects a collision and backs off. Therefore, repeater 510 can predict when it might receive a data packet transmitted from the node within any slot time interval. Being able to predict the potential arrival time at the repeater of a data packet transmitted from a node following either the deferral by or backoff timer expiration for the node is sufficient for repeater 510 to substantially prevent uncontrolled collisions with any node whose associated retransmission attempt counter has a value greater than zero.

Predicting Backoff Timer Expiration

The present invention includes circuitry at each port of a repeater to model the backoff mechanism of a node connected to each port. With reference to FIG. 8, the circuitry includes the collision detection mechanism (collision detect logic 810 and associated inputs and outputs) and retransmission attempt counter logic (RAC 815 and associated inputs and outputs) described above. In addition, the present invention maintains a slot time counter for each port,, e.g., slot time counter 820 in retiming module 581 associated with port 511, wherein the slot time counter is incremented from 0 to 511 each slot time or until a collision occurs at the node connected to the port.

Whenever a collision is detected at the node connected to a particular port, the slot time counter associated with that port is reset to its initial value, e.g., zero. For example, slot time counter 820 receives an asserted signal over collision detect line 811 when collision detect logic 810 detects a collision at node 160. The slot time counter then begins counting bit times from the end of the carrier signal received from the node. The slot time counter is clocked with a bit clock recovered from the bit stream received from the attached node (receive clock 424 in FIG. 8). Given that the slot time in a CSMA/CD LAN is 512 bit times, the slot time counter is a nine-bit counter that rolls over from a count of 511 to zero at the end of each slot time interval. Every time the slot time counter rolls over to zero is a potential arrival time for a data packet from the node because the backoff algorithm utilizes a backoff period that is a multiple of the slot time of the LAN according to the CSMA/CD MAC protocol.

The most significant bit of the slot time counter is asserted for the latter half of the slot time, prior to the potential arrival time of a data packet. Assertion of the most significant bit of the slot time counter likely indicates the potential arrival time of a data packet at the beginning of the next slot time from the node attached to the port with which the slot time counter is associated. The assertion of the most significant bit (MSB) of the slot time counter is synchronized (e.g., by way of a synchronization module such as synchronization module 825 in retiming module 581 of port 511) to a clock in repeater 510 (transmit clock 480). The synchronized assertion of the slot time counter's MSB is then passed as a signal on a Potential Data Packet Arrival Time (PDPAT) line, e.g., PDPAT line 830, to the central arbitration circuitry, e.g., arbiter 520, in repeater 510. For example, the retiming module 581 of port 511 asserts PDPAT line 830 each time the most significant bit of slot time counter 820 is set, indicating it is likely node 160 will transmit a data packet to port 511 at the beginning of the next slot time.

If the arbiter 520 opens an arbitration window while the PDPAT signal for a port is asserted, then repeater 510 may receive a data packet from the node attached to the port during the arbitration window. If the PDPAT signal associated with a port in the repeater is unasserted while the arbitration window is open, then repeater 510 begins forwarding a data packet (e.g., the preamble of a data packet) to the attached node, thus forcing the node to defer rather than initiate transmitting a data packet at that time, thereby avoiding an uncontrolled collision at the node.

Arbitration on an Idle LAN

LAN 100 is considered idle if repeater 510 is currently not receiving a data packet from any node, and more than one IPG plus one half slot time has elapsed since repeater 510 forwarded a data packet. In this event, repeater 510 waits until it begins to receive the start of a data packet from a node. If no other nodes are in backoff at this time, or if there are nodes in backoff and the PDPAT signal for each of such nodes is unasserted, then repeater 510 immediately forwards the data packet to all other nodes. However, if at least one node is backed off and its PDPAT signal is asserted, the repeater 510 opens an arbitration window.

While the arbitration window is open, repeater 510 sends the beginning of a data packet (e.g., the preamble) to any node whose corresponding PDPAT signal is unasserted to prevent such node from beginning to transmit a data packet. The arbitration window stays open until one half slot time has elapsed, or until the retransmission attempt counter associated with the node that is the current potential arbitration winner is greater than that of any node whose corresponding PDPAT signal is asserted, or until repeater 510 is either receiving a data packet from a node or sending preamble to all nodes. Repeater 510 then closes the arbitration window and makes the final arbitration decision.

Post Deferral Arbitration

Whenever a node is transmitting a data packet, any of the other nodes may be deferring. If a node is deferring, it will attempt to begin transmitting a data packet one IPG after such node detects the end of the data packet currently being transmitted. Because of the propagation delay between nodes in LAN 100, there is an inherent arbitration period, hereafter referred to as a post deferral arbitration period, beginning one IPG interval after the end of a data packet is transmitted and continuing for one half slot time, during which a collision may occur. The post deferral arbitration period is separate from the arbitration window defined by the present invention, although the former does affect the latter, as described below.

From the perspective of repeater 510, the earliest expected arrival time of another data packet from the node that just transmitted the last data packet is at the beginning of the post deferral arbitration period, i.e., after the IPG has elapsed following the last data packet transmitted on the LAN. The expected arrival time for a data packet from another node attached to a port of repeater 510 by a relatively short communication medium segment is shortly after the beginning of the post deferral arbitration period, due to the relatively short propagation delay associated with the relatively short communication medium. The worst case arrival time for a data packet from another node is at the end of the post deferral arbitration period for a node attached to repeater 510 by a maximum length communication medium segment, due to the propagation delay of the maximum length segment. Throughout the post deferral arbitration period, repeater 510 does not forward a data packet or send preamble to any node.

At the end of the one half slot time interval following an IPG, i.e., at the end of the post deferral arbitration period, repeater 510 does one of three things: i) if repeater 510 has not received a data packet from any node in LAN 100, then the LAN is idle and repeater 510 waits to receive a data packet from a node; ii) if repeater 510 has received a data packet from one or more nodes, and there are no other nodes presently backed off whose PDPAT signal is asserted and whose associated retransmission attempt counter has a value greater than or equal to the current potential arbitration winner among the one or more nodes, then repeater 510 makes an arbitration decision, selecting one of the one or more nodes, and begins forwarding a data packet from the winning node to all nodes other than the selected node; or iii) if repeater 510 has received a data packet from one or more nodes and there is at least one node in backoff whose PDPAT signal is asserted and such node could win the arbitration, then repeater 510 opens an arbitration window for up to another one half slot time, i.e., in addition to and immediately following the post deferral arbitration period. During the arbitration window, repeater 510 sends preamble to any nodes whose PDPAT signal is unasserted so that they defer transmission. Repeater 510 closes the arbitration window under the same conditions described above in connection with arbitration in an idle LAN.

Figure 3:
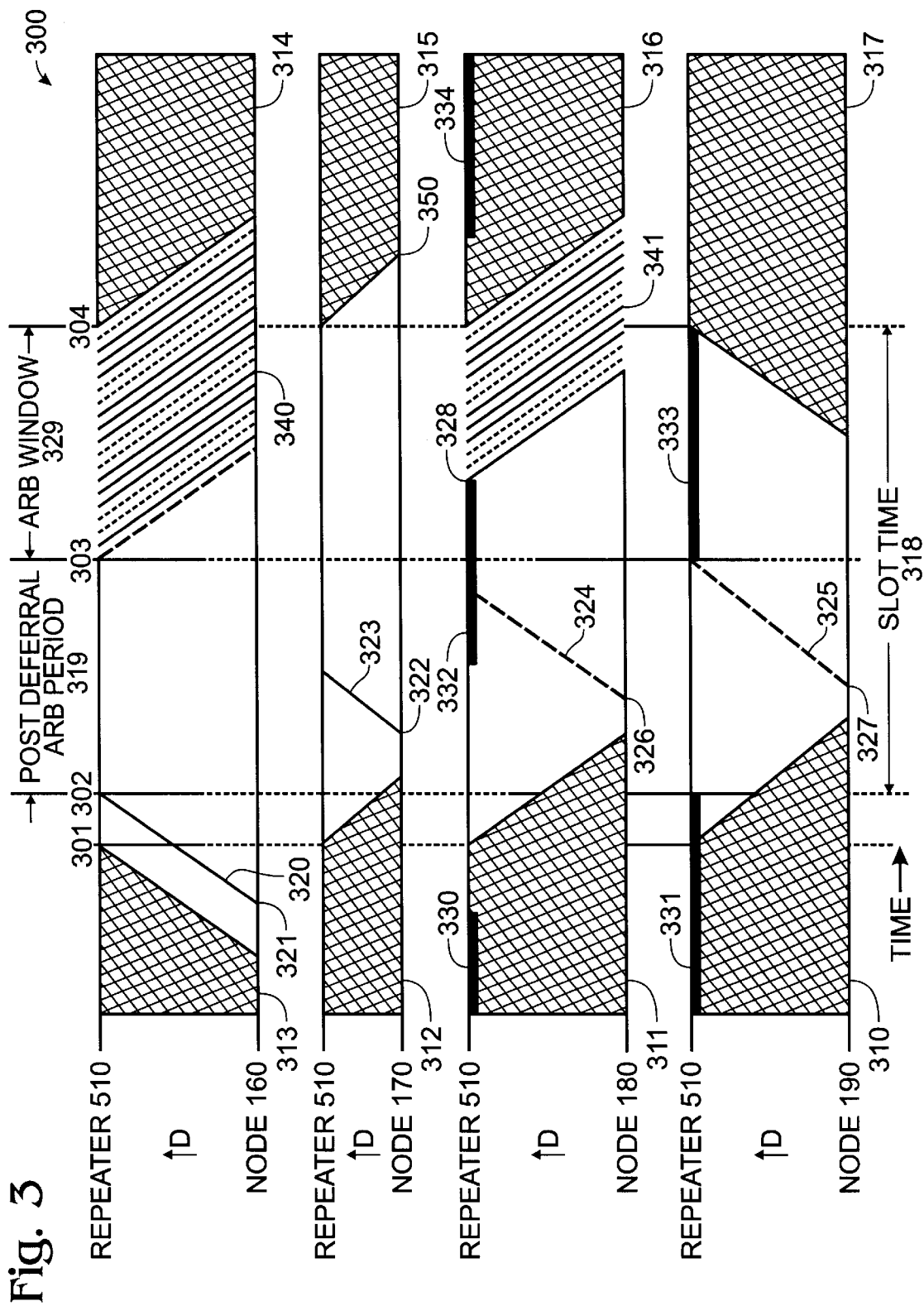
FIG. 3 is a time-space diagram showing the post-deferral arbitration for four nodes as embodied by the present invention.

FIG. 3 provides a time-space diagram showing arbitration for each of nodes 160, 170, 180 and 190. As with FIG. 2, the horizontal axis in the diagram indicates propagation time, in which time progresses horizontally from left to right. The vertical axis indicates a distance, D, along the length of the corresponding communication medium segment between each node and repeater 510. Recall from the above discussion that nodes 160 and 190 are respectively connected to repeater 510 via maximum length communication medium segments 120 and 150, while nodes 170 and 180 have shorter connections to repeater 510 via segments 130 and 140, respectively. Thus, the distance D between node 160 or 190 and repeater 510 is equal, whereas the distance between node 180 and repeater 510 is relatively shorter and the distance between node 170 and repeater 510 is shorter still. It is important to recall that while each node is connected to repeater 510 via a separate point to point communication medium segment, the repeater causes the segments to collectively function as a single communication medium over which only one node can successfully transmit a data packet at a time.

Again, referring to FIG. 3, the shaded areas represent a data packet being transmitted by a node and forwarded by repeater 510 to all other nodes, e.g., shaded area 313 represents the in-progress transmission of a first data packet from node 160 to repeater 510, while shaded area 312 represents the first data packet being forwarded by repeater 510 to node 170, as indicated by the slope of the shaded areas. Likewise, shaded areas 311 and 310 represent the first data packet being forwarded by repeater 510 to nodes 180 and 190, respectively.

Further with respect to FIG. 3, time 301 represents the time at which the end of the first data packet represented by shaded area 313 reaches repeater 510 and begins to be forwarded by the repeater to nodes 170, 180, and 190. Time 302 represents, from the perspective of the repeater, the end of an IPG following transmission of the first data packet and the beginning of post deferral arbitration period 319, which is one half slot time in duration, as discussed above, and thus elapses at time 303. In the example illustrated in FIG. 3, after an IPG following transmission of the first data packet, node 160 initiates transmission of a second data packet at time 321, which begins to arrive at repeater 510 at time 302, the beginning of post deferral arbitration period 319. The propagation delay in such transmission is represented by the slope of line 320. Repeater 510 buffers the second data packet in FIFO 710 during the post deferral arbitration period 319 while determining if another data packet arrives from one of nodes 170, 180 and 190.

Node 170 initiates transmission of a third data packet at time 322, one IPG interval after it sees the end of the first data packet forwarded by repeater 510 from node 160. Since node 160 has just completed transmitting the first data packet, it has the lowest priority of all nodes, so repeater 510 flushes the FIFO buffer of the second data packet it is receiving from node 160 and begins buffering the third data packet it is receiving from node 170. The slope of line 323 indicates the propagation delay in connection with transmitting the third data packet over communication medium segment 130. Note that while the slope of line 323 is identical to the slope of line 320, indicating communication medium segments 120 and 130 operate at the same data transmission speed, the length of line 323 is shorter than line 320 commensurate with the shorter length of segment 130 relative to segment 120. The dashed lines 324 and 325 beginning at times 326 and 327 each respectively illustrate the earliest potential transmission of a data packet from nodes 180 and 190 had they been deferring to the first data packet transmitted by node 160.

Heavy lines on the repeater end of the communication medium connecting each of nodes 180 and 190 to repeater 510 indicate assertion of the respective PDPAT signal associated these nodes, e.g., the PDPAT signal for node 180 is asserted during a period of time represented by line 332, whereas the PDPAT signal for node 190 is asserted for the period of time indicated by line 333. Assertion of the PDPAT signal for node 190 as shown by line 333 represents the worst case timing since the PDPAT signal is first asserted at time 303, i.e., at the end of post deferral arbitration period 319. Because the PDPAT signals for nodes 180 and 190 are asserted during time periods 332 and 333 respectively, repeater 510 begins an arbitration window 329 at time 303 according to the present invention.

At the same time repeater 510 opens arbitration window 329, it also starts sending preamble to node 160 as indicated by hatched area 340, so that node 160 defers transmission of a data packet. Repeater 510 starts sending preamble to node 160 concurrent with the opening of arbitration window 329, i.e., at time 303, because sending the preamble any later could cause a late collision at node 160 (if node 160 began transmitting a data packet one half slot time after time 321) in violation of the CSMA/CD MAC protocol.

In the example illustrated in FIG. 3, as of time 303, node 160 was the last node to transmit a data packet. Thus, causing node 160 to defer by transmitting preamble to it is not detrimental since repeater 510 has already determined node 160 will not win arbitration because node 170 has higher priority. However, even if node 170 had not initiated transmission of a data packet at time 322, repeater 510 would still send preamble to node 160 to cause a collision at node 160, so as to avoid a potential uncontrolled collision with nodes 170, 180 or 190.

Repeater 510 begins sending preamble to node 180, as indicated by hatched area 341, as soon as the PDPAT signal for node 180 is unasserted (depicted by the end of line 332 at time 328) because no data packet has been received by repeater 510 from node 180. This ensures that node 180 defers to whichever node ultimately wins the arbitration. A fourth data packet from node 190, depicted by shaded area 317, arrives at the end of arbitration window 329 (at time 304) just as the PDPAT signal for node 190 is unasserted (depicted by the end of line 333 at time 304). Since node 190 has higher priority than node 170, node 190 wins the arbitration. (Unlike node 190, node 170 was not backed off, so the associated retransmission attempt counter for node 170 has a value of zero as compared to a value of one for node 190). Thus, repeater 510 begins to forward the fourth data packet received from node 190 to all other nodes, as illustrated by shaded areas 314, 315 and 316. The fourth data packet received from node 190 begins to arrive at node 170 at time 350, approximately one slot time after node 170 began transmitting at time 322, just in time to cause a collision at node 170, but importantly, not a late collision.

Alternative Embodiments

When repeater 510 opens an arbitration window as described above, the total duration of the arbitration period, including both post deferral arbitration period 319 and arbitration window 329, can be a full slot time 318. Thus, when a node is selected as an arbitration winner and its data packet is forwarded, all other nodes detect a collision just before it can be considered a late collision. In an alternative embodiment, it is possible to provide a greater margin by synchronizing the arrival of a data packet from each node after a deferral period. This is accomplished by a serial-in-parallel-out shift register and multiplexer at the transmit and receive side of each communication medium segment. Repeater 510 uses the multiplexer to select the proper shift register output to give each segment the same delay as a maximum length segment.

Short-term Fairness and Deterministic Access

The traditional collision detection and backoff method employed by a CSMA/CD LAN provides fair media access for each node, at least when averaged over a fairly long time interval (equivalent to tens of thousands of data packets). Over a short time interval, however, the method provides an unfair advantage to those nodes with low retransmission attempt counts. This phenomena is known as the Capture Effect because it allows one node to effectively capture the medium and transmit multiple (sometimes thousands) of consecutive data packets without allowing other nodes to transmit any data packets. The arbitration mechanism of the present invention eliminates the Capture Effect by giving the arbitration advantage to nodes with high retransmission attempt counts. This provides both long-term and short-term fairness in media access. The Capture Effect is a major source of the potentially very long media access latencies experienced by nodes in a CSMA/CD LAN, so by eliminating the Capture Effect the present invention also significantly reduces the average media access latency for nodes in a CSMA/CD LAN.

The arbitration provided by the present invention further assures that the highest retransmission count that can be reached by any node is equal to the number of nodes in the LAN. Consider a CSMA/CD LAN with eight nodes that all collide on every transmission. On the first transmission, one node continues to transmit through the collision while the other nodes backoff and increment their retransmission attempt count. On the next transmission, one of the nodes has a retransmission attempt count of 0 while the other seven nodes all have an attempt count of 1. Thus, the present invention selects one of those nodes with an attempt count of 1 to transmit through the collision. On the next transmission one node has an attempt count of 0, another node has an attempt count of 1, and the other six nodes have a retransmission attempt count of 2. The present invention then selects one of the nodes with a retransmission attempt count of 2. This process continues until the eighth transmission when each node will have a unique retransmission attempt count ranging from 0 to 7. The present invention selects the node with a retransmission attempt count of 7. On the ninth transmission, each node will again have a unique retransmission attempt count ranging from 0 to 7. The method embodied by the present invention has thus reached a steady state.

The above discussion implies that the highest retransmission attempt count that can be reached is one less than the number of nodes in the LAN, but recall that there is a postdeferral arbitration period where repeater 510 may have to cause a collision at the node that just completed successfully transmitting a data packet even though repeater 510 does not know for sure that one of the nodes in backoff will begin transmitting a data packet during the present slot time. This effectively means that a node that has just completed transmitting a data packet may immediately get its retransmission attempt count incremented from 0 to 1 without any other node transmitting a data packet or taking part in the collision. Therefore, the highest retransmission attempt count that can be reached by any node is equal to the number of nodes in the LAN.

The above example presents the worst case scenario in terms of number of collisions, in which all nodes experience a collision on every transmission attempt. In actuality, the likelihood of this scenario is quite small. As some of the nodes reach higher retransmission attempt counts, they are more likely to back off for a longer period of time, thus allowing the other nodes multiple opportunities to transmit a data packet. But when one of the nodes backs off for a long time, that effectively leaves seven nodes contending for the medium. The highest retransmission attempt count that can be reached with seven nodes is seven. The result is that even when each node is selecting a random backoff interval, the highest retransmission attempt count that can be reached by any node is equal to the total number of nodes. Given fifteen nodes, the highest attempt count is 15, and no node will ever discard a data packet due to reaching the excessive retransmission attempt count of 16. Thus, the absolute maximum access latency can be calculated, thereby providing deterministic access to the communication medium.

What is claimed is:

1. In a repeater that prioritizes data packets received during an arbitration window from nodes each coupled to the repeater via a point to point communication medium segment to determine which of the data packets to forward, a method for preventing transmission of a data packet from a node to the repeater such that the data packet would otherwise be received at the repeater outside the arbitration window, comprising the steps of:

a) opening the arbitration window;

b) receiving data packets from the nodes during the arbitration window; and c) if it is likely the repeater will receive after closing the arbitration window a data packet transmitted from a node while the arbitration window is still open, then transmitting data to the node while the arbitration window is open, but before the node begins transmitting a data packet, thereby causing the node to defer transmitting a data packet until the repeater can receive the data packet when a subsequent arbitration window is opened.

2. The method of claim 1, wherein the arbitration window is one half slot time.

3. In a repeater having a plurality of ports each coupled to one of a corresponding plurality of nodes via a point to point communication medium segment, the repeater prioritizing data packets received during an arbitration window from the nodes to determine which of the data packets to forward, a method for preventing transmission of a data packet from a node to the repeater such that the data packet would otherwise be received at the repeater outside the arbitration window, comprising the steps of:

a) for each port, identifying when the port is likely to receive a data packet from a corresponding node;

b) opening an arbitration window when a port receives a data packet;

c) if the arbitration window is open while a port is identified as likely to receive a data packet from a corresponding node, then waiting to receive data packets from the nodes during the arbitration window, including the corresponding node; and d) if the arbitration window is open while a port is not identified as likely to receive a data packet from a corresponding node, then forwarding data to the corresponding node, thereby causing the corresponding node to defer transmitting a data packet that may otherwise be received by the repeater after the arbitration window is closed.

4. The method of claim 3, wherein the step of identifying for each port when the port is likely to receive a data packet from a corresponding node includes the steps of tracking the slot times for each node and identifying when the port is likely to receive a data packet from a corresponding node at the beginning of each slot time.

5. The method of claim 4, wherein the step of tracking the slots times for each node comprises the steps of:

a) resetting and synchronizing a slot time counter associated with each port when a collision occurs at the node coupled thereto;

b) incrementing the slot time counter associated with a port each bit time following a collision at the node coupled thereto;

c) identifying a subsequent slot time according to the slot time counter and resetting the slot time counter accordingly; and d) repeating steps a–c.

6. In a local area network (LAN) utilizing a carrier sense, multiple access with collision detection (CSMA/CD) media access protocol, the LAN comprising a repeater having a plurality of ports each coupled to a corresponding one of a plurality of nodes via a point to point communication medium segment, a method for controlling collisions when the LAN is idle, comprising the steps of:

a) if the repeater is not receiving a data packet from any one of the plurality of nodes, then waiting to begin receiving a data packet from a node;

b) if the repeater is receiving a data packet from a node and no other nodes have attempted to transmit a data packet, detected a collision and backed off, then forwarding the data packet to the other nodes when received;

c) if the repeater is receiving a data packet from a node and there are other nodes that have attempted to transmit a data packet, detected a collision and backed off, but such other nodes are unlikely to transmit a data packet, then forwarding the data packet to the other nodes when received;

d) if receiving a data packet from a node and at least one other node has attempted to transmit a data packet, detected a collision, backed off, and is likely to attempt to transmit the data packet again, then:

i) opening an arbitration window;

ii) forwarding data to other nodes that are unlikely to transmit a data packet to prevent such other nodes from transmitting a data packet;

iii) waiting to receive a data packet from the at least one other node during the arbitration window until:

A) one half slot time has elapsed since the arbitration window was opened; or

B) an arbitration winner is selected among the node from which the data packet was received and the at least one other node likely to transmit a data packet.

\* \* \* \* \*